United States Patent [19]
Falk

[11] 3,985,829

[45] Oct. 12, 1976

[54] HIGH IMPACT POLYBLENDS FROM HYDROGENATED BUTADIENE POLYMERS

[75] Inventor: John C. Falk, Des Plaines, Ill.

[73] Assignee: Borg-Warner Corporation, Chicago, Ill.

[22] Filed: June 19, 1974

[21] Appl. No.: 480,891

[52] U.S. Cl. .......................... 260/879; 260/880 R; 260/881; 260/887
[51] Int. Cl.² ..................... C08L 51/04; C08L 9/00
[58] Field of Search ................ 260/879, 880 R, 881, 260/887

[56] References Cited
UNITED STATES PATENTS

| | | | |
|---|---|---|---|
| 2,731,439 | 1/1956 | Jones | 260/879 |
| 3,531,445 | 9/1970 | Yoshimoto | 260/80.7 |
| 3,671,607 | 6/1972 | Lee | 260/876 R |
| 3,728,417 | 4/1973 | Knaack | 260/878 |

*Primary Examiner*—Christopher A. Henderson, Jr.
*Attorney, Agent, or Firm*—Richard J. Schlott

[57] ABSTRACT

High impact thermoplastic polyblend compositions prepared by polymerizing vinylaromatic and/or vinyl nitrile monomers in the presence of rubbery substrates of fully hydrogenated 1,2-polymerized butadiene and copolymers thereof. The products exhibit surprisingly high impact and tensile properties despite a very low content of graft polymer.

7 Claims, No Drawings

HIGH IMPACT POLYBLENDS FROM HYDROGENATED BUTADIENE POLYMERS

BACKGROUND

This invention relates to thermoplastic polymeric compositions comprising vinylaromatic monomer, vinyl nitrile monomer and hydrogenated polybutadiene. More particularly, this invention relates to high impact thermoplastic compositions prepared by the copolymerization of styrene and acrylonitrile in the presence of a substrate of hydrogenated 1,2-polybutadiene, or a copolymer thereof. Still more particularly this invention relates to polyblend compositions which exhibit surprisingly high impact and tensile properties comprising styrene and acrylonitrile copolymers prepared by polymerization in presence of polybutadiene or a copolymer thereof having greater than 30% 1,2-polymerized units which has been hydrogenated to remove substantially all the ethylenic unsaturation, and to particular methods for their preparation.

High impact materials based on styrene and acrylonitrile copolymers reinforced with minor amounts of butadiene are well known, and a great many of these are prepared by graft copolymerization of styrene and acrylonitrile in the presence of polymers and copolymers of butadiene. Such materials, now commonly referred to as acrylonitrile-butadiene-styrene (ABS) graft polymers or resins have become widely used and accepted in part because they exhibit desirable rigidity and hardness as well as a high degree of resistance to impact. In the native, unstabilized form, however, these resins are very susceptable to deterioration and embrittlement by exposure to weathering in sunlight. One approach to improving weathering characteristics employed in the art has been to substitute all or part of the polybutadiene portion of these compositions with more stable, rubbery substrates having low levels of ethylenic unsaturation. A particularly well-known example of such compositions is a graft copolymer of styrene and acrylonitrile on a rubbery ethylene-propylene-diene monomer terpolymer. In this instance, low levels of unsaturation are included in the rubbery substrate by way of a copolymerizable non-conjugated diene monomer in order to provide sites for grafting and crosslinking during the subsequent copolymerization. Graft copolymers of styrene and acrylonitrile on rubbery ethylene-propylene copolymers have also been prepared, and processes for preparation of these include peroxidation of the substrate in order to obtain grafting on the substrate. These and other prior art processes involving low unsaturation rubbers have been directed to techniques for producing high levels of grafting of the styrene and acrylonitrile on the rubbery substrate, since it was generally observed that in the absence of a substantial level of grafting on these particular substrates, the resulting compositions exhibited low impacts and had otherwise inferior properties. The utilization of low unsaturation rubbers for preparing high impact rubber-reinforced styrene-acrylonitrile resins has thus been limited to rather specific substrates and particular, often complex process techniques.

Accordingly, a high impact, rubber-reinforced resin utilizing rubber substrates containing substantially no ethylenic unsaturation which could be prepared without resort to inducing high levels of grafting would be a novel and useful advance in the art. Such materials could thus be produced without the need for complex and closely-controlled process techniques, and hence would be more readily and economically manufactured.

SUMMARY OF THE INVENTION

It has now been found that high impact resin compositions result when vinyl monomers are polymerized in the presence of reinforcing amounts of polymers and copolymers containing 1,2-polymerized butadiene from which substantially all detectable aliphatic unsaturation has been removed by hydrogenation. These compositions are properly termed polyblends in that only a minor portion, frequently substantially none, of the resulting newly-polymerized vinyl monomer component is grafted to the hydrogenated 1,2-polybutadiene or copolymer component, and the composition is substantially a blend of polymeric species containing no significant amount of a graft component. The tensile and impact properties are unexpectedly and quite surprisingly good in spite of the fact of a very low level of grafting to the rubbery substrate.

DETAILED DESCRIPTION

The rubbery component is a polymer or copolymer of butadiene having greater than 30% of the butadiene monomer units in the form of 1,2-polymerized units which is prepared and hydrogenated by conventional processes. As is well known, 1,3-butadiene monomer may be polymerized by a variety of techniques to give polymers having a high proportion of units having 1,4 attachment. Certain commercial techniques based on anionic polymerization technology are also well known whereby the 1,3-butadiene may be polymerized through the 1,2 positions to give polymers having a high level of units having 1,2 attachment. Such polymers can be produced in a variety of molecular weight ranges with varying proportions of 1,2- to 1,4-units and may also include additional vinyl monomers. For purposes of this invention, the preferred substrate materials are those having molecular weights between 25,000 and 500,000, more preferably between 50,000 and 250,000 and which contain not less than 30% and preferably at least 40% 1,2-polymerized butadiene units. Polymers having lower molecular weights are more difficult to prepare and are uneconomical while substrates having a molecular weight greater than about 500,000 are difficult to handle in the subsequent copolymerization step and the final polyblends become difficult to handle in postforming operations. A high level of 1,2-content is especially important to the properties of the final product, since as will be further described below, the substrates are to be hydrogenated. As is known in the art, polybutadienes which are primarily made up of 1,4-polymerized units give polyethylene-like, non-rubbery materials when the unsaturation is removed by hydrogenation. The rubbery character of the hydrogenation product increases with high levels of 1,2-polymerized units, and become quite rubbery when the major portion of the structure is the 1,2-unit. Well known commercially useful techniques exist for the production of polybutadienes having greater than about 60, often above 70%, of the monomer units in the 1,2-polymerized form. Polymers produced by these processes are generally useful in that the hydrogenation products exhibit sufficiently rubbery characteristics for the purposes of this invention.

Copolymers of butadiene containing up to 60% of a second vinyl monomer such as styrene, vinyl toluene and the like are also useful for the purposes of this invention. In the case of rubbery copolymers the presence of the vinyl monomer units also serves to impart a rubbery character to the subsequent hydrogenation product.

Hydrogenation of the rubbery substrate may be carried out by a variety of well-established processes, including hydrogenation in the presence of such catalysts as Raney Nickel, noble metals such as platinum, palladium and the like or the "soluble" transitions metal catalysts. The preferred process is one wherein the butadiene-containing substrate is dissolved in an inert hydrocarbon diluent such as cyclohexane and hydrogenated by reaction with hydrogen in the presence of a soluble hydrogenation catalyst such as is disclosed in U.S. Pat. No. 3,113,986. These and similar low pressure hydrogenation processes are rapidly and conveniently carried out to give virtually complete removal of aliphatic unsaturation from the butadiene portion of polymeric substrates. In the practice of the instant invention, the hydrogenation is carried out until no aliphatic unsaturation remains insofar as can be detected by ordinary infrared spectroscopic techniques. The technique employed for the preparative examples suffices for detecting levels of unsaturation greater than about 0.1–0.2% by weight, corresponding to one $c=c$ group in 1,000 to 2,000 carbon atoms.

As indicated above, the resin polyblends are made by polymerizing one or more vinyl monomers in the presence of the rubbery hydrogenated substrate. Vinyl monomers useful for these purposes include acrylonitrile, substituted acrylonitriles such as methacrylonitrile, alpha-chloroacrylonitrile, alpha-bromoacrylonitrile propionitrile and the like, styrene, substituted styrenes such as alpha-methyl styrene, the halostyrenes such as p-chlorostyrene, the alkyl vinyl benzenes such as vinyl toluene, vinyl ethyl benzene and the like, and the acrylic and methacrylic esters of $C_1$–$C_8$ alcohols, exemplified by methyl methacrylate, ethyl acrylate and the like. The vinyl monomers may be employed singly or in combination to give respectively homopolymer and copolymer components in the polyblend products.

Conventional free-radical polymerization methods may be employed for polyblend preparation, including solution, suspension and emulsion processes. The preferred process is one whereby the hydrogenated substrate is converted to a cross-linked latex, and the polymerization is then carried out in the presence of this latex utilizing an oil-soluble free-radical initiator.

EXAMPLE I. PREPARATION AND HYDROGENATION OF 1,2-POLYBUTADIENE

A beverage bottle was charged with 700 ml of cyclohexane, degassed, sealed, then pressurized with dry nitrogen. A hypodermic syringe needle was inserted through the seal, and 30.0 grams (0.56 moles) of butadiene-1,3-monomer, followed by 0.33 m moles of N,N,N′, N′-tetramethylethylene diamine and 0.3 m moles of sec-butyl lithium (0.1 m in cyclohexane). The bottle was then placed in a water bath at 50° C. and maintained for 16 hours. An aliquot of the mixture was removed after quenching with isopropanol, from which it was determined that the polybutadiene had $\eta_{sp/c}$ = 1.63 (toluene, 25° C.) and a microstructure corresponding to 69% content of 1,2-polymerized units.

Hydrogenation of the polybutadiene was carried out on the above polymer solution after diluting with dry cyclohexane to a concentration of 20 g./liter of solution.

A two-liter stirred reactor was charged with 1500 ml of the above cyclohexane solution of 1,2-polybutadiene, together with 0.3 mole percent (based on double bonds) of a soluble cobalt catalyst.

Soluble cobalt catalysts may be prepared by adding 8.5 g. of a cobalt (II) octoate solution containing 12.0 weight percent cobalt over a period of 90 minutes to 287 ml of a cyclohexane solution containing 0.0854 moles of n-butyl lithium. The product is a 0.285 M solution of soluble cobalt catalyst having a Li/Co ratio of 5.0/1. An alternative preparation of soluble cobalt catalysts involves the addition of 23.6 g. of cobalt (II) octoate solution over a period of 90 minutes to a solution of 18.8 g. of triethyl aluminum in 494.6 g. of cyclohexane. The product is a 0.073 M solution of soluble cobalt catalyst having a 3.45/1 Al/Co ratio.

The hydrogenation reaction was maintained at 50° C. and hydrogen gas was bubbled into the reactor at 50 psi until no detectable unsaturation remained as determined for an aliquot sample by infrared analysis. The mixture was then removed from the reactor, extracted with dilute aqueous acid to remove catalyst residues, coagulated by pouring into isopropanol, collected and dried at 40° C. in a vacuum oven.

EXAMPLE 2. PREPARATION OF POLYBLENDS BY SOLUTION COPOLYMERIZATION

A solution of hydrogenated 1,2-polybutadiene, prepared by dissolving 10.0 g. of the hydrogenated polymer obtained by the processes of Example 1 in 400 ml of dry chlorobenzene, was charged to a beverage bottle, together with 60.0 g. of styrene monomer, 30.0 g. of acrylonitrile monomer and 1.0 g. of benzoyl peroxide. The bottle was sealed and placed in a heated thermostated water bath at 72° C. for 20 hours. The mixture was then cooled, coagulated in isopropanol, and the solid product collected by filtration. After drying at 60° C. in a vacuum oven, the yield of product was determined to be 96.0 g.

EXAMPLE 3. PREPARATION OF POLYBLENDS BY SOLUTION - PRECIPITATION POLYMERIZATION

A solution of hydrogenated 1,2-polybutadiene, prepared by dissolving 10.0 g. of hydrogenated 1,2-polybutadiene obtained as in Example 1 in 477 ml of a 1:1 benzene-hexane solvent mixture, were charged to a 1 quart beverage bottle, together with 60.0 g of styrene monomer, 30.0 g. of acrylonitrile monomer and 0.89 g. of benzoyl peroxide. The bottle was sealed and placed in a thermostated water bath heated to 72° C. for 20 hours. The product is observed to precipitate during polymerization in this solvent mixture, giving a swollen polymer/solvent mixture. The mixture was coagulated in isopropanol and the solid, when collected by filtration, dried at 60° C. and weighed, amounted to 97 g.

EXAMPLE 4. PREPARATION OF POLYBLENDS BY SOLUTION - SUSPENSION POLYMERIZATION

A solution of 10.0 g. of hydrogenated 1,2-polybutadiene in 76 ml of chlorobenzene was suspended in 1140 ml of water containing 0.23 g. of polyvinyl alcohol. Styrene monomer (60.0 g.), acrylonitrile monomer (30.0 g) and 1.0 g. of benzoyl peroxide were added to the suspension was then stirred and heated to 72° C., then held at 72° C with stirring for 20 hours. The product, obtained by coagulating the mixture and drying the collected solids at 60° C. in a vacuum oven, amounted to 97.0 g.

EXAMPLE 5. PREPARATION OF POLYBLENDS BY LATEX POLYMERIZATION

A solution of 14.0 g. of hydrogenated 1,2-polybutadiene in 140 ml of cyclohexane prepared as in Example 1 was added to 200 ml of water containing 0.6 g. of benzoyl peroxide and a surfactant and stirred at high speed for 1 minute using a Premier Mill Dispersator device. The resulting mixture was then passed immediately through a homogenizer to produce a latex.

The resulting latex was heated 20 hours at 72° C. to effect substrate crosslinking. Coagulation during this step amounted to less than ½%. Any coagulum present was removed by filtration through cheese cloth.

The latex was mixed with 120 g. of water, followed by 55.0 g. of styrene monomer, 31.0 g. of acrylonitrile and 2.0 g. of benzoyl peroxide. The reaction mixture was stirred at 72° C. for 20 hours, and poured into isopropanol to effect product coagulation. The solid, collected, dried at 60° C. in a vacuum oven and weighed, amounted to 97.0 g.

EXAMPLE 6. PREPARATION OF POLYBLENDS BY LATEX POLYMERIZATION USING SOLVENT-STRIPPED LATEX

The procedure of Example 5 was followed to obtain an homogenized latex. The latex was heated with .6 g. of benzoyl peroxide as before, except that solvent cyclohexane was continuously removed by distillation during the crosslinking step to give an organic solvent-free aqueous latex. Again, coagulation amounted to less than ½% and filtration through cheese cloth was employed to remove any coagulum present.

The latex was then mixed with water, styrene monomer, acrylonitrile monomer and benzoyl peroxide and polymerization to produce a polyblend was carried out as in Example 5. The dried product amounted to 98.0 g.

Additional examples of polyblends were prepared with variations in rubber content, monomers, monomer ratios and substrate composition and microstructure employing the processes given in Examples 1–6. These products are summarized in Table I below, together with physical property data for each. Films and plaques for physical property measurements were prepared by milling each product for 6 min. at 320° F. with 0.25% Irganox 1010 thermal stabilizer and 0.25% magnesium stearate, then compression molding at 10,000 psi and 450° F.

For comparison purposes, polyblend materials were prepared from a commercial EPDM substrate, and from a conventional anionic 1,4-polybutadiene which was hydrogenated by the process employed in Example 1. Additionally, two blends were made by blending a hydrogenated 1,2 polybutadiene substrate with a separately-prepared styrene-acrylonitrile copolymer. These data are reported in Table II.

TABLE I

Preparation and Physical Properties of Polyblends Based on Hydrogenated Polybutadiene (HPBde) Substrates

| | Preparations | | | | Properties[4] | | | | | |
|---|---|---|---|---|---|---|---|---|---|---|
| Ex. | HPBde[1] (grams) | Styrene (grams) | VCN[2] (grams) | Method[3] No. | HDT °C | Izod Impact | U PSI | E (%) | Flexural Modulous (KPSI) | Remarks |
| 2. | 10 | 60 | 30 | 2 | — | 0.8 | 6650 | 7 | 432 | |
| 3. | 10 | 60 | 30 | 3 | — | 2.6 | 5500 | 8 | 365 | |
| 4. | 10 | 60 | 30 | 4 | — | 1.5 | 3400 | 6 | 251 | |
| 5. | 14 | 55 | 31 | 5 | 93 | 8.0 | 6500 | 12 | 346 | |
| 6. | 14 | 55 | 31 | 6 | 91 | 2.3 | 5200 | 5 | 357 | |
| 7. | 20 | 51 | 29 | 5 | 92 | 7.6 | 5500 | 17 | 262 | |
| 8. | 14 | 43 | 43 | 6 | 94 | 0.9 | 8100 | 9 | 392 | |
| 9. | 14 | 64.5 | 21.5 | 6 | 92 | 2.6 | 6400 | 5 | 367 | |
| 10. | 16 | 49.3 | 24.7 | 6 | — | 2.8 | 3050 | 5 | — | |
| 11. | 25 | 50 | 25 | 2 | — | 4.0 | 3200 | 13 | 210 | |
| 12. | 25 | 50 | 25 | 4 | — | 5.2 | 3000 | 7 | 115 | |
| 13. | 25 | 50 | 25 | 3 | — | 3.2 | 1000 | 10 | 130 | |
| 14. | 50 | 33 | 17 | 6 | — | — | 240 | 30 | — | |
| 15. | 20 | 40 | (40MMA) | 6 | (77) | (1.4) | (5700) | (5) | (203) | One Example |
| 16. | 20 | 45 + [6.4AMS] | 28.6 | 6 | 89 | 0.9 | 3800 | (13) | (209) | Values in (Δ) Are for one test |
| 17. | 20(SBR) | 51 | 29 | 6 | 85 | 1.0 | 6400 | 8 | 345 | Hydrogenated Styrene-Butadiene copolymer substrates[5] |
| 18. | 20(SBR) | 51 | 29 | 6 | 83 | 1.4 | 5900 | 10 | 350 | Hydrogenated Styrene-Butadiene copolymer substrates[6] |
| 19. | 20 | 51 | 29 | 6 | 82 | 2.4 | 5200 | 7 | 330 | 40% vinyl Polybutadiene Hydrogenated Substrate |

Notes:
[1]Hydrogenated Polybutadiene, prepared as in Example 1.
[2]VCN = Acrylonitrile; MMA = methyl methacrylate; AMS = alpha-methylstyrene
[3]Method No. = Polymerization methods of Examples 2–6
[4]Properties: HDT = heat distortion temperature; Impact = Izod Impact, ft.lbs/in notch 73°F;U = Ultimate Tensile Strength; E = tensile elongation
[5]Substrate is random copolymer of 52% styrene, 48% butadiene, having 69% vinyl content (based on butadiene content) prepared by substituting a 52/48 mixture of styrene and butadiene for butadiene in the process of Example 1; Hydrogenated by the procedure of example 1.
[6]Substrate is block copolymer of 25% styrene, 75% butadiene, having above 40% vinyl content (based on butadiene content prepared by processes disclosed in U.S. Pat. No. 3,700,633, and hydrogenated by the procedure of example 1.

TABLE II

CONTROL BLENDS AND GRAFTS EMPLOYING LOW UNSATURATION RUBBER SUBSTRATES

| | Preparations | | | | | Properties | | | |
|---|---|---|---|---|---|---|---|---|---|
| Ex. No. | Substrate Type | grams | Styrene grams | VCN[1] grams | Method[2] No. | HDT °C | Impact | U PSI | E % | Flexural Modulous KPSI |
| 20. | Commercial EPDM | 14 | 55 | 31 | 6 | 87 | 0.6 | 3500 | 14 | 238 |
| 21. | Commercial EPDM | 14 | 64.5 | 21.5 | 5 | 85 | 0.8 | 3500 | 5 | 310 |
| 22. | Hydrogenated 1,4-PBDe[4] | 20 | 51 | 29 | 5 | 79 | 0.4 | 6600 | 5 | 385 |
| 23. | HPBde | 20 | 51 | 29 | Bl | 92 | 0.4 | 4700 | 5 | 303 |
| 24. | HPBde | 20 | 51 | 29 | Bl | 95 | 0.5 | 2600 | 5 | 259 |

Notes:
[1] (Note 2, Table 1)
[2] (Note 3, Table 1)
[3] (Note 4, Table 1)
[4] Anionic Polybutadiene, Vinyl content 10%, Hydrogenated by the process of Example 1
[5] Bl = Blend of separately prepared substrate and rigid phases, as latices.

The data for control Examples 20 and 21 demonstrate that substitution of low unsaturation rubbers of the EPDM type for hydrogenated 1,2-polybutadiene result in products having lower Izod impact and heat distortion than found for the compositions of this invention. A comparison of Example 22 with Examples 8 and 19 establishes that high impact materials are not obtained without including a sufficiently high level of vinyl (or 1,2) microstructure to impart rubbery character to the hydrogenated substrate. Examples 15–18 are provided to show that including additional vinyl monomers and replacement by other monomers is possible. The physical properties of these single examples demonstrate impact improvement, however, no optimization of proportions and processes to produce the most attractive combination of properties was attempted.

The compositions of Examples 2–19 illustrating this invention are effectively blends having very little detectable graft component. A conventional Soxhlet extraction method employing acetone to remove the soluble rigid phase, followed by IR analysis of the insoluble substrate phase was employed for determining graft efficiencies and in Examples 2–19 the level of grafting was in the range 1–3%. A blending of the individual substrate and rigid superstrate components did not result in equivalent properties as shown in Examples 23 and 24, compared with polyblend Example 8. These polyblends are therefore unique in their properties, particularly in that they could not have been predicted by way of established processes based on EPDM rubber substrates, which are said to depend for good impact on high levels of grafting, and the physical properties are considerably different from those predictable from a knowledge of simple blends of polymeric materials.

The polyblends of this invention would be expected to be more resistant to deterioration in properties caused by exposure to weathering than the widely known conventional acrylonitrile-butadiene-styrene thermoplastics by virtue of the exclusion of ethylenic unsaturation from the substrate rubber. A single weathering test was carried out to compare the effects of weathering on an ABS resin and a polyblend of this invention. The data are summarized in Table III. Further enhancement of weathering resistance could be expected if commercially available fillers, UV stabilizers and the like were to be included in the formulations.

TABLE III

EFFECT OF OUTDOOR WEATHERING EXPOSURE ON PROPERTIES

| | Hours | ABS[1] Impact[3] | ABS[1] % Retained | Polyblend[2] Impact[3] | Polyblend[2] % Retained |
|---|---|---|---|---|---|
| Outdoor | 0 | 6.1 | — | 3.7 | — |
| | 336 | 2.9 | 59 | 3.9 | (100) |
| | 672 | 2.8 | 47 | 3.1 | 84 |
| | 1344 | 2.3 | 45 | 2.5 | 68 |
| | 2688 | 1.9 | 38 | 2.3 | 62 |

[1] ABS = Conventional graft copolymer of acrylonitrile and styrene (1.8:1) on polybutadiene; rubber content 20% Molded without UV Stabilizers
[2] Polyblend = Polyblend of Example 6, separately prepared and molded for this test. Tensile strength = 7080 psi; Izod Impact 3.7 ft.lbs/in notch.
[3] Impact = Izod impact, units ft.lbs/in notch at 73° F.

It will be apparent from these weathering data that ABS undergoes a rapid initial loss in impact properties, indicating embrittlement, whereas the polyblend of this invention retains impact properties over a longer period of time. Clearly, the ability for retention of properties is improved by the replacement of the butadiene substrate rubber with a hydrogenated 1,2-polybutadiene substrate.

Polyblends of this invention are thus seen to possess important and attractive physical properties including high ultimate tensile strength, rigidity and impact, which will make them commercially attractive as engineering thermoplastics for use in a wide variety of applications and potentially including applications where resistance to weathering is sought.

Thus it will be seen that the polyblends of this invention are vinylaromatic-vinylnitrile-hydrogenated polymers and copolymers of 1,2-polymerized-butadiene thermoplastic compositions having unexpected impact properties. Even though the hydrogenated substrate has substantially all the ethylenic unsaturation removed and the resulting polyblend contains virtually no graft copolymer, these polyblends have excellent physical properties including high impact, which is quite unexpected in view of the prior art. Modifications and variations will be apparent which do not depart from the scope and spirit of the invention, which is to be construed by the provisions of the appended claims.

We claim:

1. A thermoplastic polyblend composition comprising the product of the free-radical polymerization of from 95 to 40 parts by weight of at least one vinyl monomer selected from the group consisting of styrene, alpha-methyl styrene, vinyl toluene, acrylonitrile, alpha-chloroacrylonitrile, methacrylonitrile, methyl acrylate and methyl methacrylate, said polymerization having been carried out in the presence of from 5 to 60 parts by weight of a hydrogenated rubbery polymer selected from the group consisting of homopolymers and copolymers of 1,3-butadiene having greater than 30% of the butadiene units as 1,2-polymerized units, said rubbery polymer having had substantially all ethylenic unsaturation removed by hydrogenation, wherein no greater than 5% of the product of the free-radical polymerization is grafted to the rubbery polymer.

2. The polyblend of claim 1 wherein the vinyl monomer comprises a mixture of styrene and acrylonitrile.

3. The polyblend of claim 1 wherein the vinyl monomer comprises a mixture of styrene, acrylonitrile and alpha-methyl styrene.

4. The polyblend of claim 1 wherein the vinyl monomer comprises a mixture of styrene and methyl methacrylate.

5. The polyblend of claim 1 wherein the rubbery polymer is a homopolymer of 1,3-butadiene.

6. A process for preparing a thermoplastic polyblend composition comprising contacting a hydrogenated rubbery polymer selected from the group consisting of homopolymers and copolymers of 1,3-butadiene containing at least 30% of the butadiene units as 1,2-polymerized monomer units, said rubbery polymer having had substantially all ethylenic unsaturation removed by hydrogenation, with at least one vinyl monomer, under a free-radical polymerization conditions whereby free-radical polymerization of the vinyl monomer results to give said polyblend composition having no greater than 5% of the vinyl monomer polymerization product grafted to the rubbery polymer.

7. The process of claim 6 wherein the rubbery polymer comprises from 5 to 60% by weight of the composition and the vinyl monomer is selected from the group consisting of styrene, alpha-methyl styrene, vinyl toluene, acrylonitrile, alpha-chloroacrylonitrile, methacrylonitrile, methyl methacrylate and methyl acrylate.

* * * * *